(12) United States Patent
Fukuda et al.

(10) Patent No.: US 12,482,608 B2
(45) Date of Patent: Nov. 25, 2025

(54) CAPACITOR MODULE

(71) Applicant: SUBARU CORPORATION, Tokyo (JP)

(72) Inventors: Hideto Fukuda, Tokyo (JP); Naonori Ikezawa, Tokyo (JP); Takahiro Yamamoto, Tokyo (JP); Kyohei Yamamoto, Tokyo (JP); Kiyofumi Sato, Tokyo (JP); Hironao Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 194 days.

(21) Appl. No.: 18/526,005

(22) Filed: Dec. 1, 2023

(65) Prior Publication Data
US 2024/0203665 A1 Jun. 20, 2024

(30) Foreign Application Priority Data
Dec. 15, 2022 (JP) ................................. 2022-200227

(51) Int. Cl.
*H01G 4/38* (2006.01)
*H01G 4/32* (2006.01)
*H01G 4/33* (2006.01)

(52) U.S. Cl.
CPC ............ *H01G 4/38* (2013.01); *H01G 4/32* (2013.01); *H01G 4/33* (2013.01)

(58) Field of Classification Search
None
See application file for complete search history.

(56) References Cited

U.S. PATENT DOCUMENTS

| | | | |
|---|---|---|---|
| 7,911,765 B2 * | 3/2011 | Takeoka | H01G 4/145 |
| | | | 361/323 |
| 9,831,035 B2 * | 11/2017 | Schmit | H01G 4/228 |
| 2017/0148570 A1 * | 5/2017 | Park | H01G 4/224 |
| 2018/0019062 A1 * | 1/2018 | Okuzuka | H01G 2/106 |
| 2019/0019625 A1 * | 1/2019 | Hirasawa | H01G 4/32 |
| 2023/0051327 A1 * | 2/2023 | Etou | H01G 4/32 |
| 2023/0274888 A1 * | 8/2023 | Imagawa | H01G 4/30 |
| | | | 307/10.1 |

FOREIGN PATENT DOCUMENTS

| | | | | |
|---|---|---|---|---|
| DE | 102019217976 B4 * | 9/2021 | | H01G 4/38 |
| JP | 2001052954 A * | 2/2001 | | H01G 4/32 |
| JP | 2013-239624 A | 11/2013 | | |
| JP | 2018-56527 A | 4/2018 | | |
| JP | 2021-34431 A | 3/2021 | | |
| WO | WO-2022117327 A1 * | 6/2022 | | H01G 2/103 |

* cited by examiner

*Primary Examiner* — Timothy J. Dole
*Assistant Examiner* — Esther N Lian
(74) *Attorney, Agent, or Firm* — TROUTMAN PEPPER LOCKE LLP

(57) ABSTRACT

A capacitor module is provided between a power storage body and an inverter. The capacitor module comprises a first film capacitor and a second film capacitor that are wound. The first film capacitor includes a first outer peripheral surface. The second film capacitor is connected in parallel to the first film capacitor and includes a second outer peripheral surface opposed to the first outer peripheral surface. A space x between the first outer peripheral surface and the second outer peripheral surface meets a predetermined expression.

4 Claims, 17 Drawing Sheets

FIG. 7

| SPACE BETWEEN CAPACITORS (x) | 0 | ... | $\frac{1}{6}\lambda$ | ... | $\frac{5}{6}\lambda$ | ... | $\lambda$ | ... | $\frac{7}{6}\lambda$ | ... | $\frac{11}{6}\lambda$ | ... | $2\lambda$ | ... | $\frac{13}{6}\lambda$ | ... |
|---|---|---|---|---|---|---|---|---|---|---|---|---|---|---|---|---|
| PEAK VALUE OF COMBINED WAVE ($\mu_0$) | 0 | DECREASED | SAME | INCREASED | SAME | DECREASED | 0 | DECREASED | SAME | INCREASED | SAME | DECREASED | 0 | DECREASED | SAME | INCREASED |
| CORRESPONDING DIAGRAM | FIG. 8 | FIG. 9 | FIG. 10 | - | FIG. 11 | FIG. 12 | FIG. 13 | FIG. 14 | FIG. 15 | - | (FIG. 11) | (FIG. 12) | (FIG. 13) | (FIG. 14) | (FIG. 15) | - |

α1, β1, α2, β2, α3, β3

FIG. 8
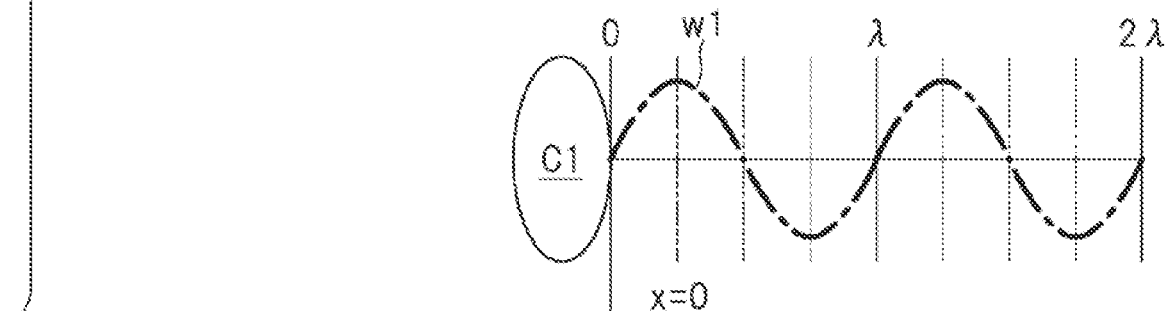
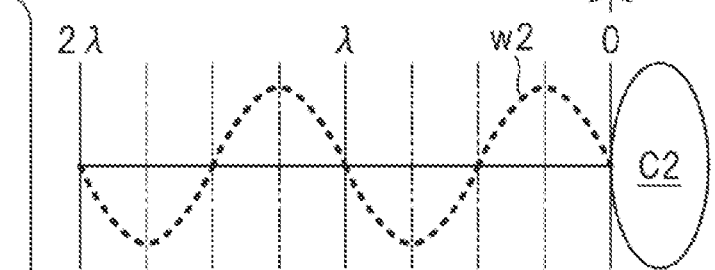
[COMBINED WAVE]
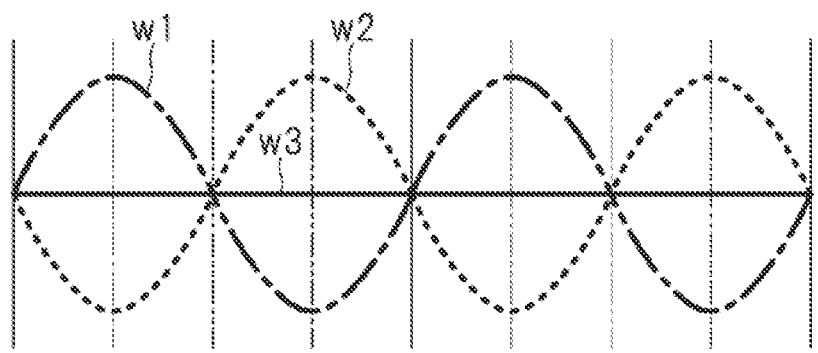

FIG. 11
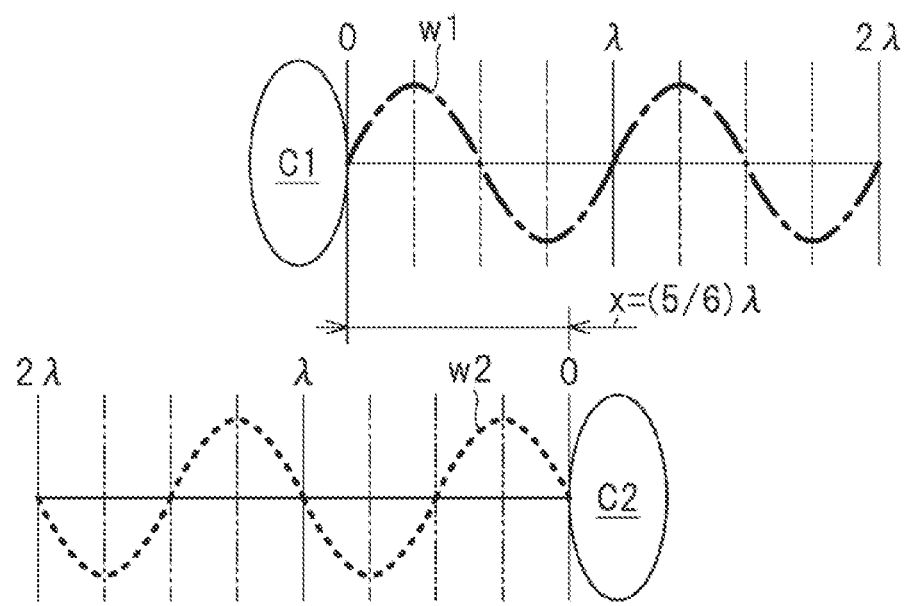
[COMBINED WAVE]
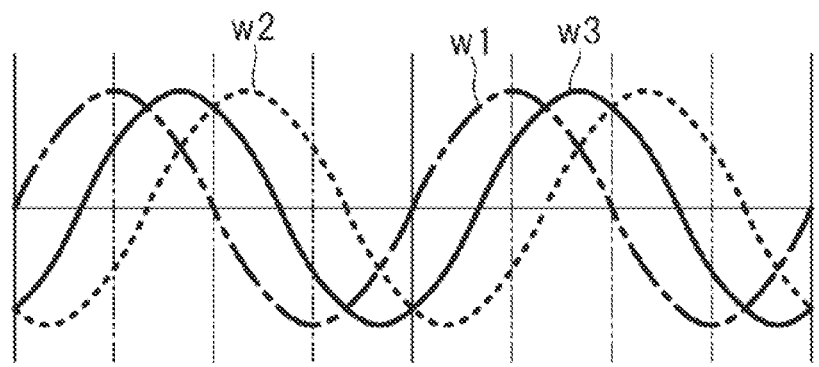

FIG. 12
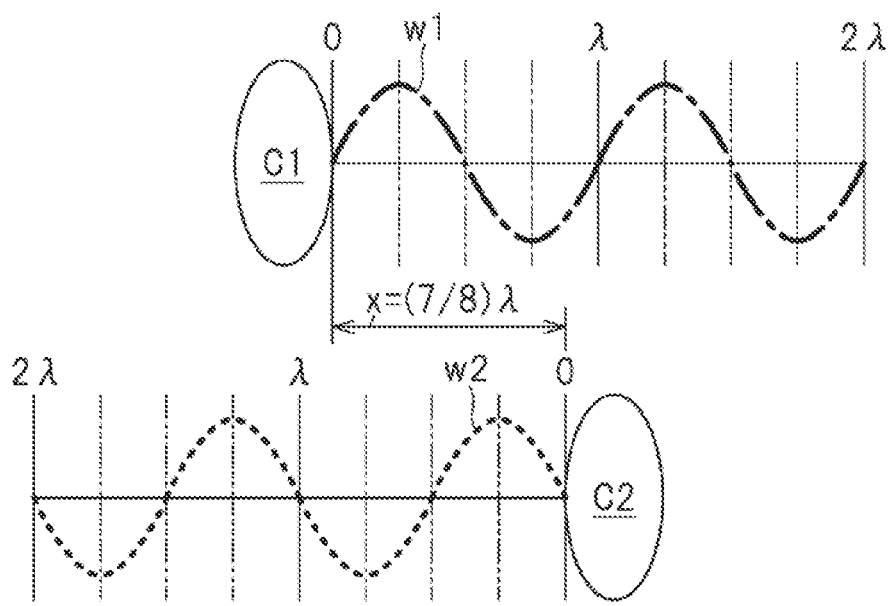
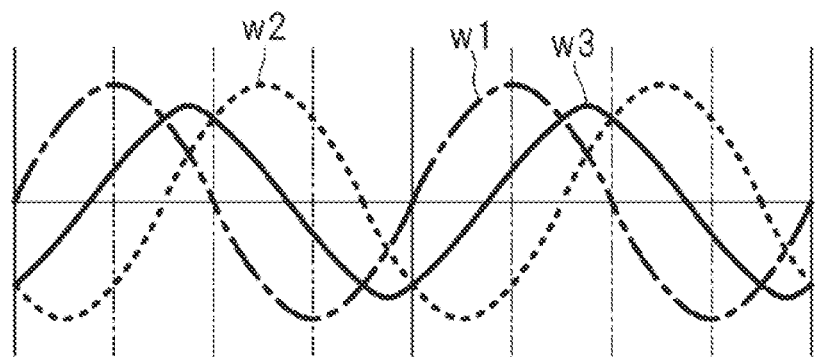

FIG. 13
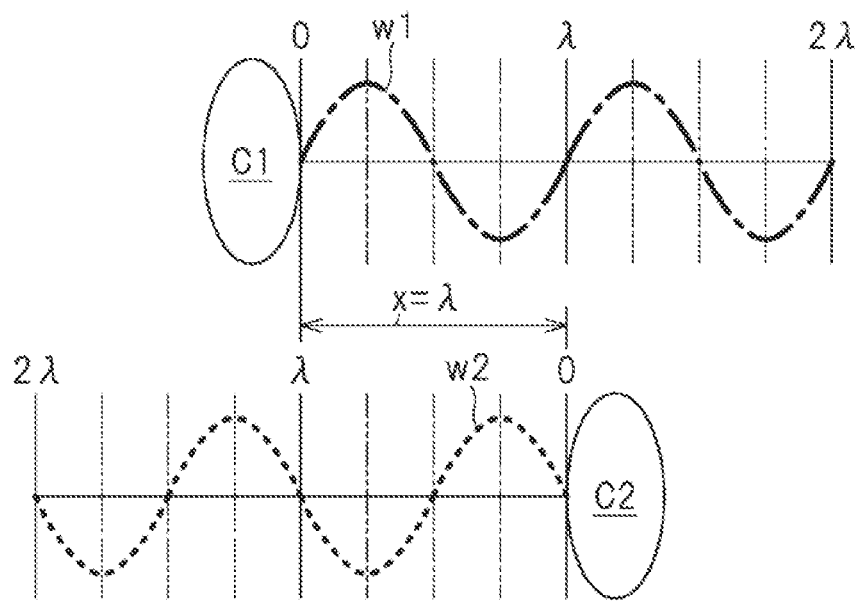
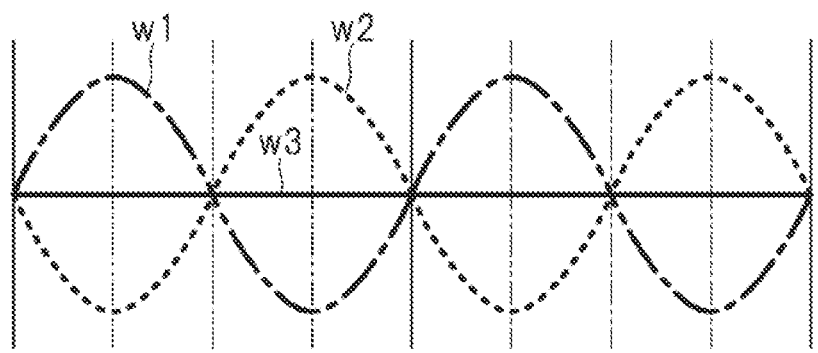

FIG. 14
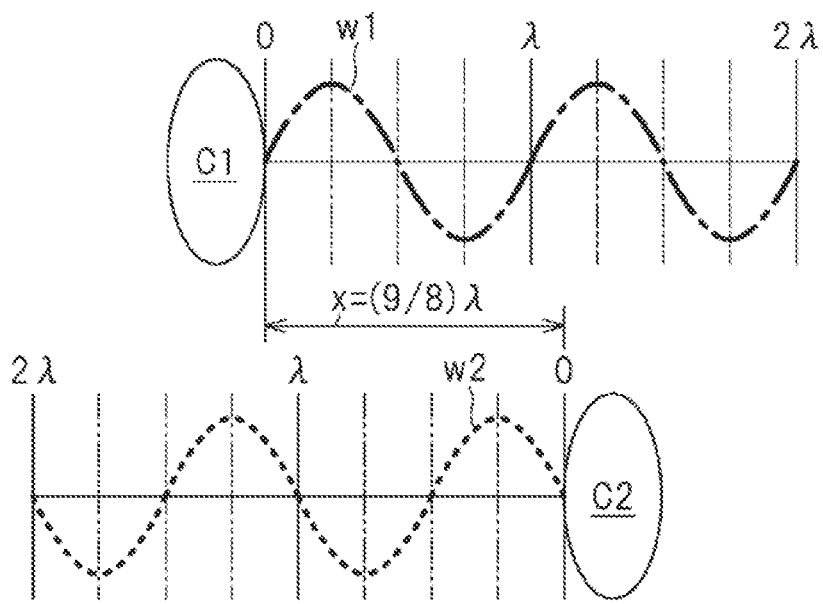
[COMBINED WAVE]
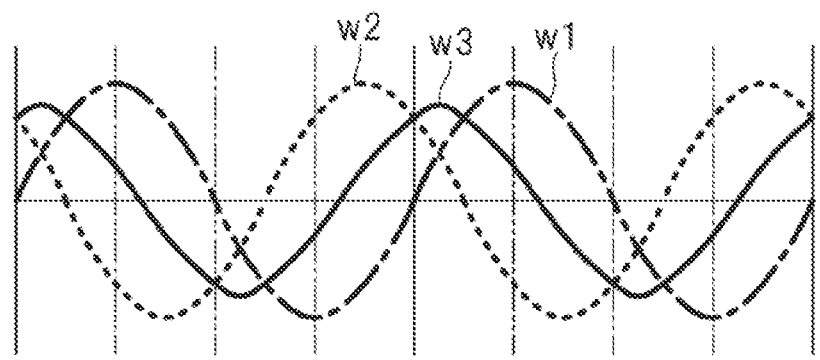

FIG. 15
[x=(7/6)λ]
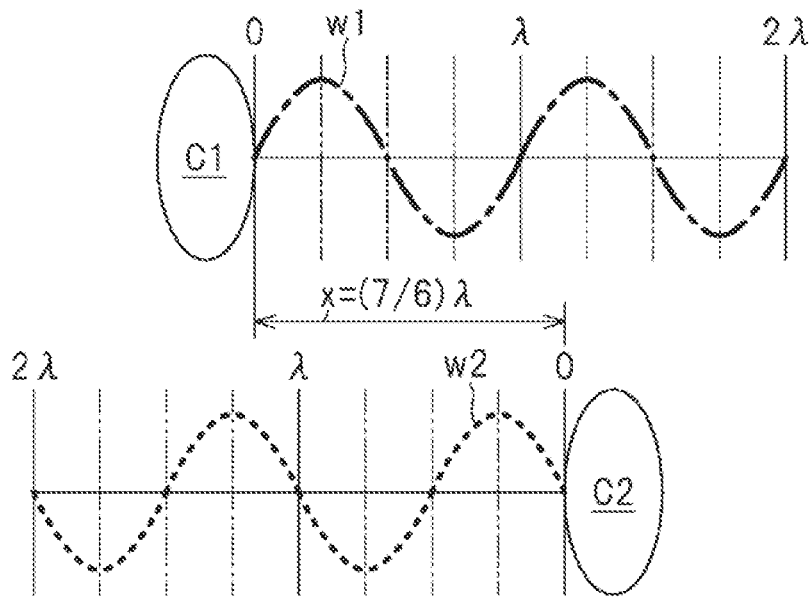
[COMBINED WAVE]
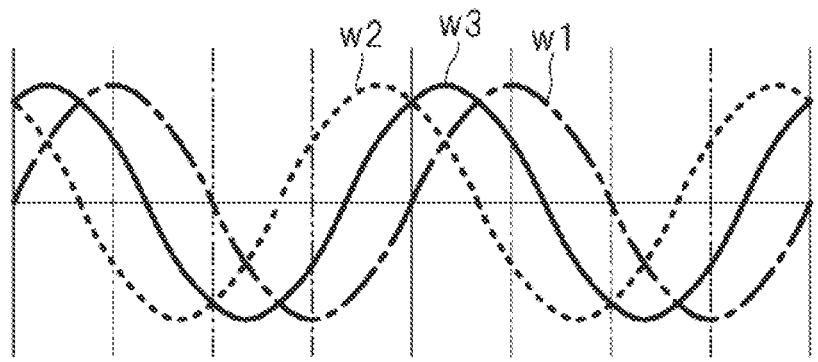

CAPACITOR MODULE

CROSS-REFERENCE TO RELATED APPLICATION

The present application claims priority from Japanese Patent Application No. 2022-200227 filed on Dec. 15, 2022, the entire contents of which are hereby incorporated by reference.

BACKGROUND

The disclosure relates to a capacitor module provided between a power storage body and an inverter.

A capacitor module including multiple film capacitors is provided between a power storage body and an inverter (refer to Japanese Unexamined Patent Application Publication (JP-A) No. 2021-34431, JP-A No. 2013-239624, and JP-A No. 2018-56527). The provision of the capacitor module between the power storage body and the inverter enables ripple current caused by switching control of the inverter to be suppressed.

SUMMARY

An aspect of the disclosure provides a capacitor module provided between a power storage body and an inverter. The capacitor module comprises a first film capacitor and a second film capacitor. The first film capacitor is wound and includes a first outer peripheral surface. The second film capacitor is wound and connected in parallel to the first film capacitor and includes a second outer peripheral surface opposed to the first outer peripheral surface. A space x between the first outer peripheral surface and the second outer peripheral surface meets Expression (1) or Expression (2) indicated below:

$$0 \le x \le \frac{1}{6}\lambda \quad (1)$$

$$\left(\frac{5}{6}+n\right)\lambda \le x \le \left(\frac{7}{6}+n\right)\lambda \quad (2)$$

wherein $$\lambda = v/f$$

v: Acoustic velocity in medium existing between the first outer peripheral surface and the second outer peripheral surface
f: Carrier frequency of the inverter
n: Integer greater than or equal to zero.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

FIG. 7 is a table indicating the relationship between a space and a combined wave;

FIG. 8 indicates the combined wave when the space between the film capacitors is zero;

FIG. 11 indicates the combined wave when the space between the film capacitors is $(5/6)\lambda$;

FIG. 12 indicates the combined wave when the space between the film capacitors is $(7/8)\lambda$;

FIG. 13 indicates the combined wave when the space between the film capacitors is $\lambda$;

FIG. 14 indicates the combined wave when the space between the film capacitors is $(9/8)\lambda$;

FIG. 15 indicates the combined wave when the space between the film capacitors is $(7/6)\lambda$;

DETAILED DESCRIPTION

In the film capacitors constituting the capacitor module, metallized films are mechanically vibrated with electrostatic force during charge and discharge and radiated sound is emitted from the film capacitors. Accordingly, the radiated sound emitted from the capacitor module is desirably suppressed.

It is desirable to suppress the radiated sound from the capacitor module.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure.

Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
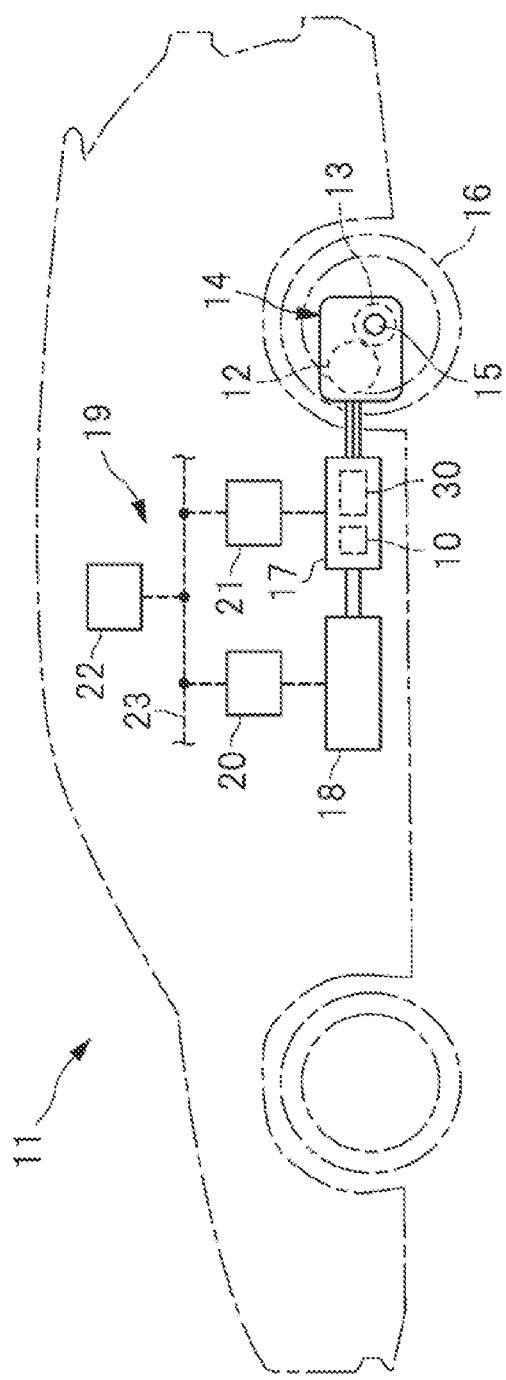
FIG. 1 is a diagram illustrating an example of an electric vehicle including a capacitor module according to an embodiment of the disclosure.

FIG. 1 is a diagram illustrating an example of an electric vehicle 11 including a capacitor module 10 according to an embodiment of the disclosure. Referring to FIG. 1, the electric vehicle 11 includes an electric axle 14 including an electric motor 12 and a differential 13. Wheels 16 are linked to the differential 13 of the electric axle 14 via an axle shaft 15. A battery 18 is connected to the electric motor 12 of the electric axle 14 via a power conversion unit 17. The electric vehicle 11 further includes a control system 19 including multiple electronic control units.

The electronic control units constituting the control system 19 include a battery control unit 20 connected to the battery 18 and a motor control unit 21 connected to the power conversion unit 17. In addition, the electronic control units constituting the control system 19 include a vehicle control unit 22 that outputs a control signal to each of the battery control unit 20 and the motor control unit 21. The respective control units 20 to 22 are connected to each other so as to be capable of communication via an in-vehicle network 23, such as a controller area network (CAN). The control units 20 to 22 each include a micro-controller (not illustrated) including a processor, a memory, and so on.

Figure 2:
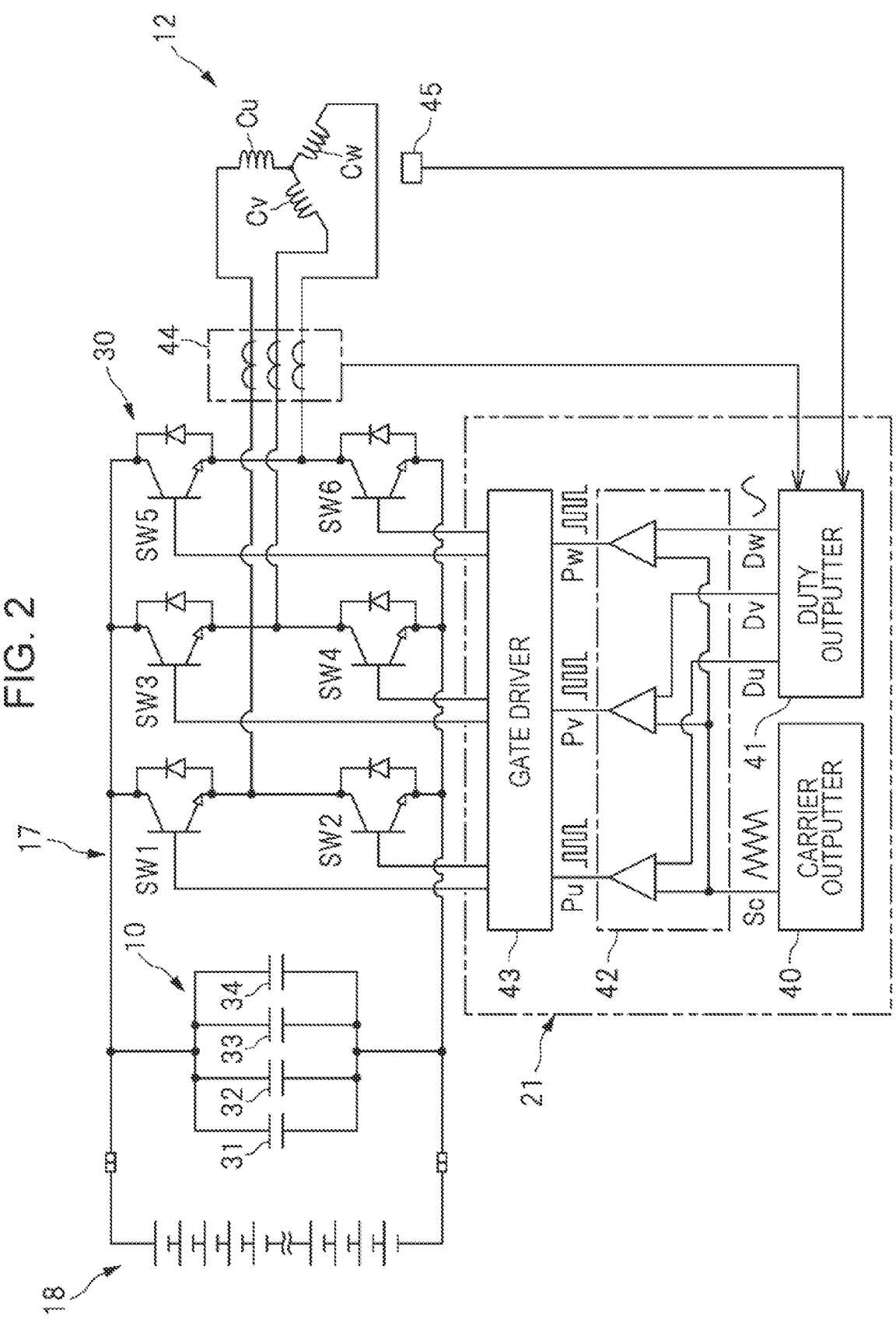
FIG. 2 is a diagram illustrating an example of a power conversion unit and a motor control unit.

FIG. 2 is a diagram illustrating an example of the power conversion unit 17 and the motor control unit 21. Referring to FIG. 2, the power conversion unit 17 includes an inverter 30 and the capacitor module 10. The inverter 30 includes multiple switching elements SW1 to SW6 constituting a three-phase bridge circuit. The switching elements SW1 to SW6 are controlled in an ON state and an OFF state through pulse width modulation control (PWM control). Direct-current power from the battery 18 is converted into alternating-current power, which is supplied to field coils Cu, Cv, and Cw of the respective motor phases (a U phase, a V phase, and a W phase). The capacitor module 10 includes multiple film capacitors 31 to 34 connected in parallel to each other. Provision of the capacitor module 10 between the battery (a power storage body) 18 and the inverter 30 enables ripple current caused by switching control of the inverter 30 to be suppressed.

The motor control unit 21 includes a carrier outputter 40, a duty outputter 41, a pulse setter 42, and a gate driver 43. The carrier outputter 40 outputs a carrier signal Sc of a certain carrier frequency. The duty outputter 41 outputs instruction duties Du, Dv, and Dw of the respective phases, which are based on a torque instruction value and so on. The pulse setter 42 compares the carrier signal Sc with the instruction duties Du, Dv, and Dw to set pulse signals Pu, Pv, and Pw for driving the switching elements SW1 to SW6. The gate driver 43 outputs a gate signal to each of the switching elements SW1 to SW6 based on the pulse signals Pu, Pv, and Pw. Energization current for the field coils Cu, Cv, and Cw is supplied from a current sensor 44 to the duty outputter 41, and the rotation angle of a rotor in the electric motor 12 is supplied from a rotation sensor 45 to the duty outputter 41.

Figure 3:
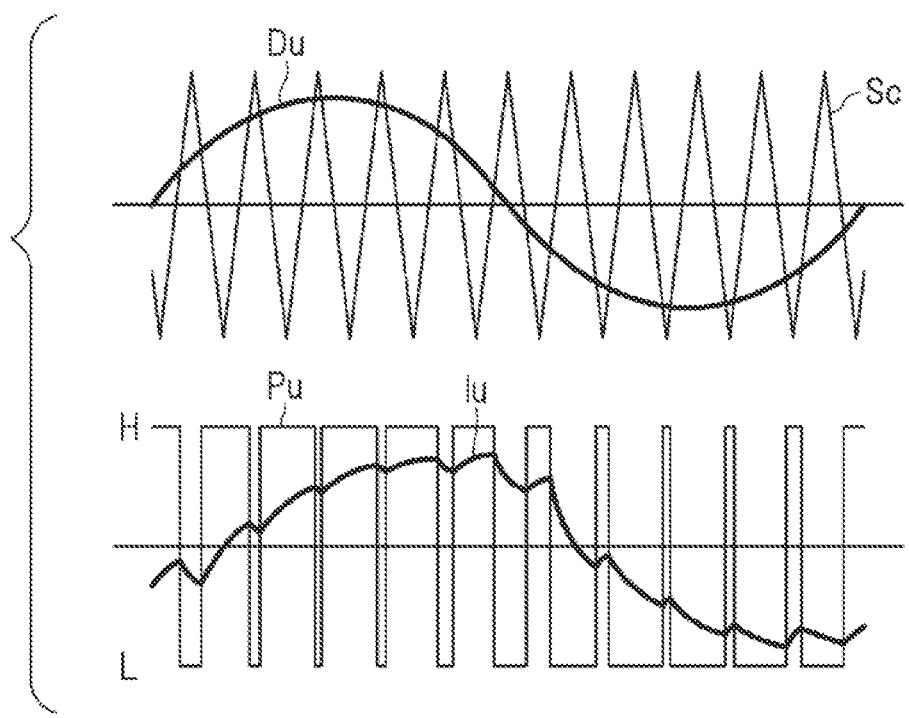
FIG. 3 is a graph indicating an example of a carrier signal, an instruction duty, and a pulse signal.

FIG. 3 is a graph indicating an example of the carrier signal Sc, the instruction duty Du, and the pulse signal Pu. Although the pulse signal Pu for the field coil Cu is exemplified in FIG. 3, the pulse signals Pv and Pw for the other field coils Cv and Cw are set in the same manner. As indicated in FIG. 3, when the carrier signal Sc is lower than the instruction duty Du, the pulse signal Pu is set to a high level. In contrast, when the carrier signal Sc is higher than the instruction duty Du, the pulse signal Pu is set to a low level. The inverter 30 is subjected to the switching control based on the pulse signal Pu to control energization current Iu for the field coil Cu.

In one example, in control of the energization current for the respective field coils Cu, Cv, and Cw, the respective switching elements SW1 to SW6 in the inverter 30 are switched between the ON state and the OFF state in response to the carrier frequency (switching frequency) of the carrier signal Sc. The capacitor module 10 is switched between a charge state and a discharge state in response to the carrier frequency to suppress the ripple current caused by the switching control of the inverter 30. Since the capacitor module 10 repeats the charge and the discharge in response to the carrier frequency, as described above, the respective film capacitors 31 to 34 are mechanically vibrated with the electrostatic force and radiated sound is emitted from the capacitor module 10. In order to resolve this problem, in the capacitor module 10 according to the present embodiment, the spaces between the respective film capacitors 31 to 34 are appropriately set in terms of suppression of the radiated sound from the capacitor module 10.

Figure 4:
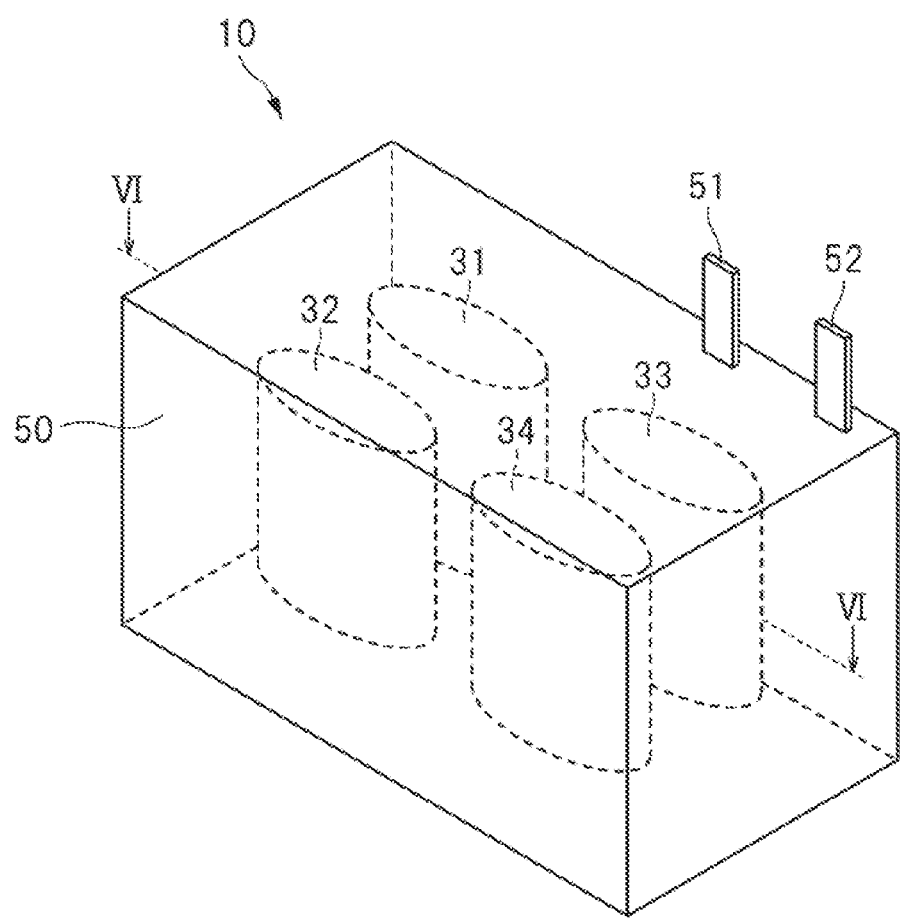
FIG. 4 is a perspective view illustrating an example of the capacitor module.
Figure 5:
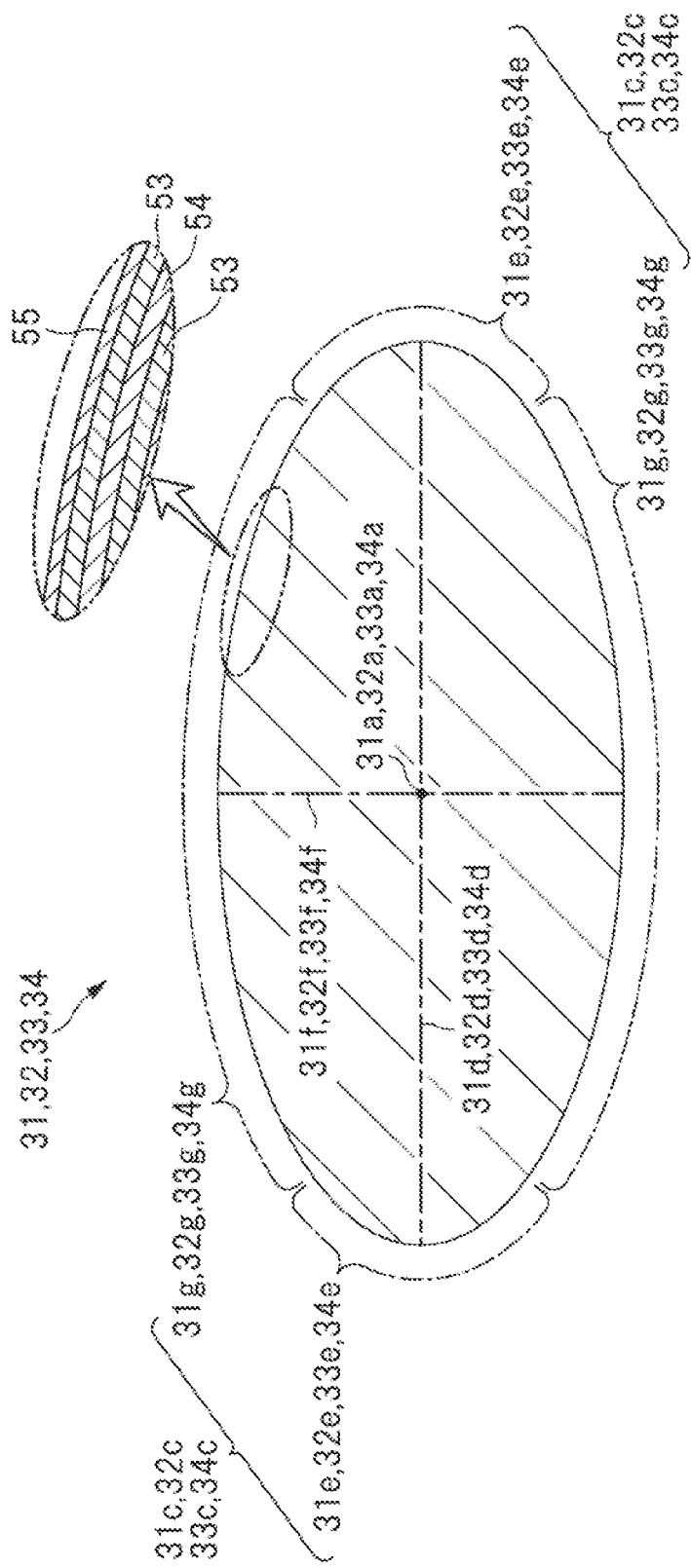
FIG. 5 is a diagram illustrating an example of a cross-sectional shape of film capacitors.
Figure 6:
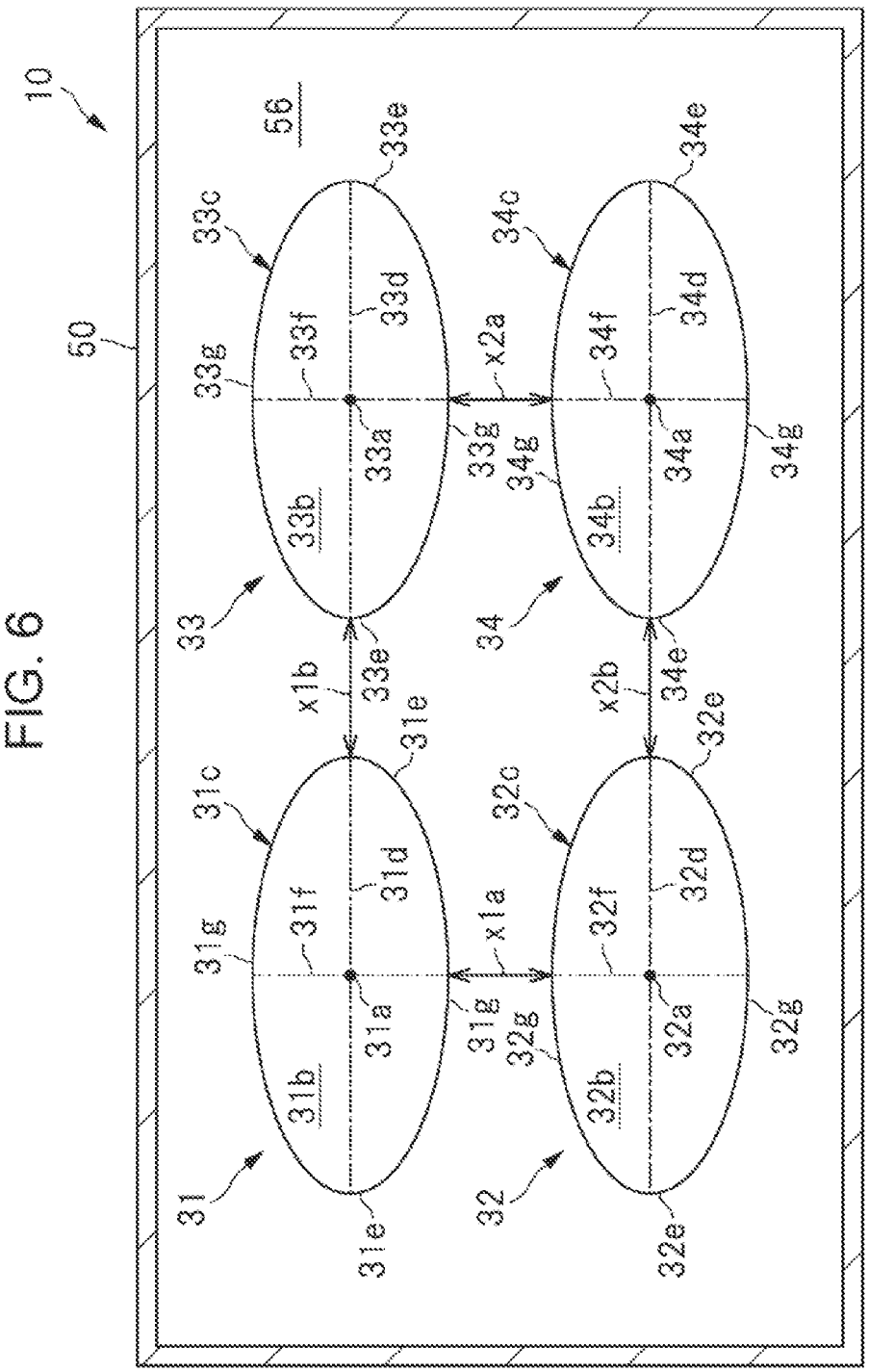
FIG. 6 is a cross-sectional view taken along the VI-VI line in FIG. 4.

FIG. 4 is a perspective view illustrating an example of the capacitor module 10. FIG. 5 is a diagram illustrating an example of a cross-sectional shape of the film capacitors 31 to 34. FIG. 6 is a cross-sectional view taken along the VI-VI line in FIG. 4. As illustrated in FIG. 4, the capacitor module 10 includes a housing 50 and the four film capacitors 31 to 34 housed in the housing 50. The capacitor module 10 has a positive-electrode terminal 51 and a negative-electrode terminal 52. The positive-electrode terminal 51 of the capacitor module 10 is connected to positive electrodes (not illustrated) of the respective film capacitors 31 to 34. The negative-electrode terminal 52 of the capacitor module 10 is connected to negative electrodes (not illustrated) of the respective film capacitors 31 to 34. In other words, the film capacitors 31 to 34 are connected in parallel to each other.

As illustrated in an enlarged portion in FIG. 5, each of the film capacitors 31 to 34 includes a pair of metallized films 53 and 54 that are wound in flattened shapes and an exterior material 55 with which the outer peripheries of the metallized films 53 and 54 are covered. The film capacitors 31 to 34 are wound film capacitors. Cross sections 31b to 34b orthogonal to center lines 31a to 34a of the respective film capacitors 31 to 34 have oval shapes, that is, flattened shapes. An outer peripheral surface 31c of the film capacitor 31 includes a pair of narrow surfaces 31e intersecting with a long axis 31d and a pair of wide surfaces 31g intersecting with a short axis 31f. An outer peripheral surface 32c of the film capacitor 32 includes a pair of narrow surfaces 32e intersecting with a long axis 32d and a pair of wide surfaces 32g intersecting with a short axis 32f. An outer peripheral surface 33c of the film capacitor 33 includes a pair of narrow surfaces 33e intersecting with a long axis 33d and a pair of wide surfaces 33g intersecting with a short axis 33f. An outer peripheral surface 34c of the film capacitor 34 includes a pair of narrow surfaces 34e intersecting with a long axis 34d and a pair of wide surfaces 34g intersecting with a short axis 34f. In other words, the narrow surfaces 31e to 34e are surfaces that intersect with the long axes 31d to 34d and do not intersect with the short axes 31f to 34f, respectively. The wide surfaces 31g to 34g are surfaces that intersect with the short axes 31f to 34f and do not intersect with the long axes 31d to 34d, respectively. The metallized films 53 and 54 are insulating films which include metal films and which are made of polypropylene or the like.

As illustrated in FIG. 6, the cross section 31b orthogonal to the center line 31a of the film capacitor 31 has a flattened shape. The outer peripheral surface 31c of the film capacitor 31 has the narrow surfaces 31e orthogonal to the long axis 31d of the cross section 31b and the wide surfaces 31g orthogonal to the short axis 31f of the cross section 31b. Similarly, the cross section 32b orthogonal to the center line 32a of the film capacitor 32 has a flattened shape. The outer peripheral surface 32c of the film capacitor 32 has the narrow surfaces 32e orthogonal to the long axis 32d of the cross section 32b and the wide surfaces 32g orthogonal to the short axis 32f of the cross section 32b. Similarly, the cross section 33b orthogonal to the center line 33a of the film capacitor 33 has a flattened shape. The outer peripheral surface 33c of the film capacitor 33 has the narrow surfaces 33e orthogonal to the long axis 33d of the cross section 33b and the wide surfaces 33g orthogonal to the short axis 33f of the cross section 33b. Similarly, the cross section 34b orthogonal to the center line 34a of the film capacitor 34 has a flattened shape. The outer peripheral surface 34c of the film capacitor 34 has the narrow surfaces 34e orthogonal to the long axis 34d of the cross section 34b and the wide surfaces 34g orthogonal to the short axis 34f of the cross section 34b.

As illustrated in FIG. 6, the wide surface 31g constituting the outer peripheral surface 31c of the film capacitor 31 is disposed so as to be opposed to the wide surface 32g constituting the outer peripheral surface 32c of the film capacitor 32. A space between the wide surface 31g and the wide surface 32g is "x1a". Similarly, the wide surface 33g constituting the outer peripheral surface 33c of the film capacitor 33 is disposed so as to be opposed to the wide surface 34g constituting the outer peripheral surface 34c of the film capacitor 34. A space between the wide surface 33g and the wide surface 34g is "x2a". The narrow surface 31e constituting the outer peripheral surface 31c of the film capacitor 31 is disposed so as to be opposed to the narrow surface 33e constituting the outer peripheral surface 33c of the film capacitor 33. A space between the narrow surface 31e and the narrow surface 33e is "x1b". Similarly, the narrow surface 32e constituting the outer peripheral surface 32c of the film capacitor 32 is disposed so as to be opposed to the narrow surface 34e constituting the outer peripheral surface 34c of the film capacitor 34. A space between the narrow surface 32e and the narrow surface 34e is "x2b". Air 56 exists in the housing 50 of the capacitor module 10. In other words, the air (medium) 56 transmitting the radiated sound exists between the respective film capacitors 31 to 34, which are opposed to each other.

The spaces x1a, x2a, x1b, and x2b of the film capacitors 31 to 34 will now be described. Any two of the film capacitors 31 to 34 are replaced with film capacitors C1 and C2 in the following description. The spaces x1a, x2a, x1b, and x2b are collectively referred to as a space x. FIG. 7 is a table indicating the relationship between the space x and a combined wave w3. FIG. 8 to FIG. 15 indicate radiated sounds w1 and w2 emitted from the film capacitors C1 and C2, respectively, and the combined wave w3 of the radiated sounds w1 and w2.

Referring to FIG. 8 to FIG. 15, the positions of the film capacitors C1 and C2, which are opposed to each other, are shifted in the long axis direction for convenience of drawing. Although the radiated sounds w1 and w2 indicated in FIG. 8 to FIG. 15 are the radiated sounds emitted from the wide surfaces of the film capacitors C1 and C2, the radiated sounds are emitted from the narrow surfaces of the film capacitors C1 and C2 in the same manner. Since the film capacitors C1 and C2 are connected in parallel to each other, the radiated sounds w1 and w2 of the same phase are emitted from the film capacitors C1 and C2. A in FIG. 7 to FIG. 15 denotes the wavelength of the radiated sounds w1 and w2.

Figure 9:
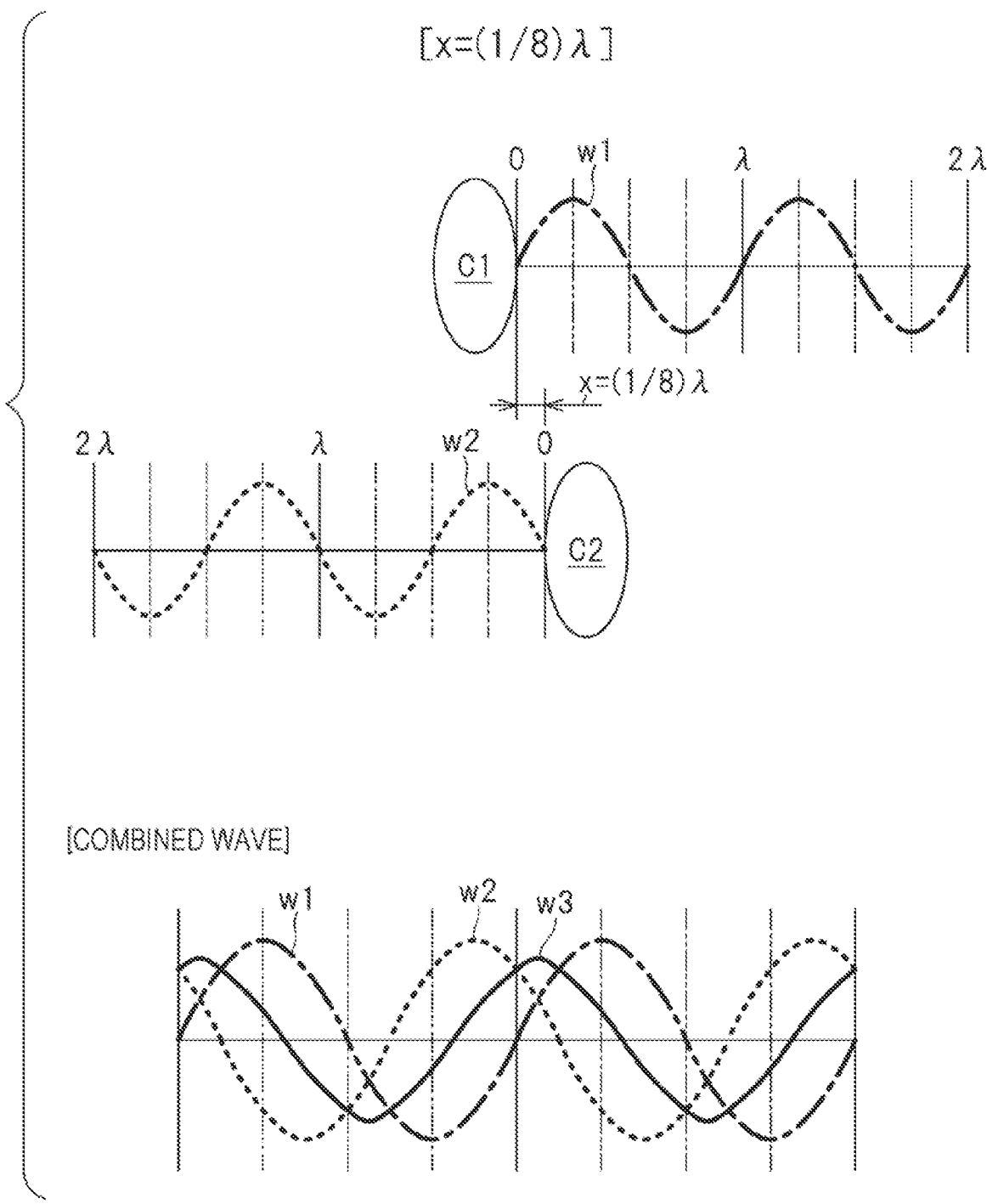
FIG. 9 indicates the combined wave when the space between the film capacitors is $(1/8)\lambda$.
Figure 10:
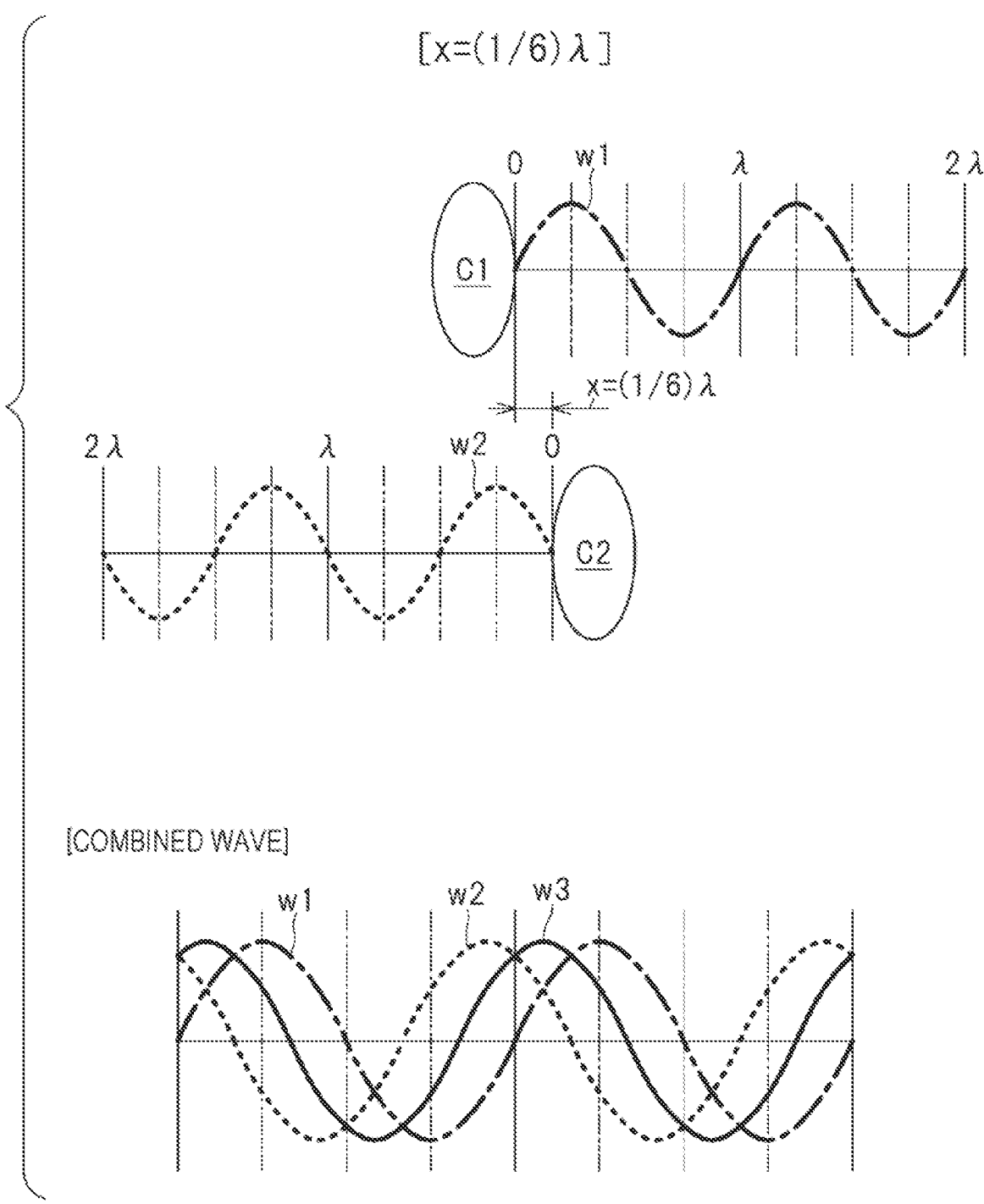
FIG. 10 indicates the combined wave when the space between the film capacitors is $(1/6)\lambda$.

FIG. 8 indicates the combined wave w3 when the space x between the film capacitors C1 and C2 is "0". FIG. 9 indicates the combined wave w3 when the space x between the film capacitors C1 and C2 is "(1/8)λ". FIG. 10 indicates the combined wave w3 when the space x between the film capacitors C1 and C2 is "(1/6)λ". FIG. 11 indicates the combined wave w3 when the space x between the film capacitors C1 and C2 is "(5/6)λ". FIG. 12 indicates the combined wave w3 when the space x between the film capacitors C1 and C2 is "(7/8)λ". FIG. 13 indicates the combined wave w3 when the space x between the film capacitors C1 and C2 is "A". FIG. 14 indicates the combined wave w3 when the space x between the film capacitors C1 and C2 is "(9/8)λ". FIG. 15 indicates the combined wave w3 when the space x between the film capacitors C1 and C2 is "(7/6)λ".

As indicated in FIG. 7 and FIG. 8, when the space x between the film capacitors C1 and C2 is "0", the radiated sound w1 has a phase opposite to that of the radiated sound w2 and the radiated sounds w1 and w2 cancel out each other. As a result, the combined wave w3 of the radiated sound w1 and the radiated sound w2 is substantially "0". Accordingly, the combined radiated sounds from the film capacitors C1 and C2 are capable of being suppressed.

As indicated in FIG. 9, when the space x between the film capacitors C1 and C2 is "(1/8)λ", the phase of the radiated sound w1 is shifted from the phase of the radiated sound w2 and the radiated sounds w1 and w2 cancel out each other. As a result, the peak value of the combined wave w3 is capable of being made lower than the peak value of the radiated sounds w1 and w2. In other words, since the peak value of the combined wave w3 is capable of being decreased when the space x is greater than zero and is smaller than (1/6)λ, as indicated in FIG. 7, the combined radiated sounds from the film capacitors C1 and C2 are capable of being suppressed.

As indicated in FIG. 7 and FIG. 10, when the space x between the film capacitors C1 and C2 is "(1/6)λ", the peak value of the combined wave w3 is substantially equal to the peak value of the radiated sounds w1 and w2. Since the combined wave w3 substantially coincides with the radiated sounds w1 and w2 when the space x is (1/6)λ, as described above, degradation due to overlapping of the radiated sounds w1 and w2 is capable of being suppressed.

As indicated in FIG. 7 and FIG. 11, when the space x between the film capacitors C1 and C2 is "(5/6)λ", the peak value of the combined wave w3 is substantially equal to the peak value of the radiated sounds w1 and w2. Since the combined wave w3 substantially coincides with the radiated sounds w1 and w2 when the space x is (5/6)λ, as described above, the degradation due to the overlapping of the radiated sounds w1 and w2 is capable of being suppressed.

As indicated in FIG. 12, when the space x between the film capacitors C1 and C2 is "(7/8)λ", the phase of the radiated sound w1 is shifted from the phase of the radiated sound w2 and the radiated sounds w1 and w2 cancel out each other. As a result, the peak value of the combined wave w3 is capable of being made lower than the peak value of the radiated sounds w1 and w2. In other words, since the peak value of the combined wave w3 is capable of being decreased when the space x is greater than (5/6)λ and is smaller than A, as indicated in FIG. 7, the combined radiated sounds from the film capacitors C1 and C2 are capable of being suppressed.

As indicated in FIG. 7 and FIG. 13, when the space x between the film capacitors C1 and C2 is "A", the radiated sound w1 has a phase opposite to that of the radiated sound w2 and the radiated sounds w1 and w2 cancel out each other. As a result, the combined wave w3 of the radiated sound w1 and the radiated sound w2 is substantially "0". Accordingly, the combined radiated sounds from the film capacitors C1 and C2 are capable of being suppressed.

As indicated in FIG. 14, when the space x between the film capacitors C1 and C2 is "(9/8)λ", the phase of the radiated sound w1 is shifted from the phase of the radiated sound w2 and the radiated sounds w1 and w2 cancel out each other. As a result, the peak value of the combined wave w3 is capable of being made lower than the peak value of the radiated sounds w1 and w2. In other words, since the peak value of the combined wave w3 is capable of being decreased when the space x is greater than λ and is smaller than (7/6)λ, as indicated in FIG. 7, the combined radiated sounds from the film capacitors C1 and C2 are capable of being suppressed.

As indicated in FIG. 7 and FIG. 15, when the space x between the film capacitors C1 and C2 is "(7/6)λ", the peak value of the combined wave w3 is substantially equal to the peak value of the radiated sounds w1 and w2. Since the combined wave w3 substantially coincides with the radiated sounds w1 and w2 when the space x is (7/6)λ, as described above, the degradation due to the overlapping of the radiated sounds w1 and w2 is capable of being suppressed.

As indicated in a range α1 in FIG. 7, when the space x between the film capacitors C1 and C2 is greater than or equal to zero and is smaller than or equal to (1/6)λ, the peak value of the combined wave w3 is capable of being lower than or equal to the peak value of the radiated sounds w1 and w2. In other words, it is possible to suppress the radiated sound from the capacitor module 10 including the film capacitors C1 and C2.

As indicated in a range α2, when the space x between the film capacitors C1 and C2 is greater than or equal to (5/6)λ and is smaller than or equal to (7/6)λ, the peak value of the combined wave w3 is capable of being lower than or equal to the peak value of the radiated sounds w1 and w2. In other words, it is possible to suppress the radiated sound from the capacitor module 10 including the film capacitors C1 and C2.

As indicated in a range α3, even when the space x between the film capacitors C1 and C2 is greater than or equal to (11/6)λ and is smaller than or equal to (13/6)λ, the peak value of the combined wave w3 is capable of being lower than or equal to the peak value of the radiated sounds w1 and w2, as in the range α2 described above. In other words, it is possible to suppress the radiated sound from the capacitor module 10 including the film capacitors C1 and C2.

In one example, when the space x between the film capacitors C1 and C2 meets Expression (1) or Expression (2) indicated below, the peak value of the combined wave w3 is capable of being lower than or equal to the peak value of the radiated sounds w1 and w2. Accordingly, the degradation due to the overlapping of the radiated sounds w1 and w2 is capable of being suppressed to suppress the radiated sound from the capacitor module 10. Although the example is indicated in FIG. 7 in which n=0 or n=1, the value of n is not limited to this. Even if n is higher than or equal to two, the radiated sound is suppressed in the same manner.

$$0 \le x \le \frac{1}{6}\lambda \quad (1)$$

$$\left(\frac{5}{6}+n\right)\lambda \le x \le \left(\frac{7}{6}+n\right)\lambda \quad (2)$$

In Expressions (1) and (2), $$\lambda = v/f$$

v: Acoustic velocity in medium existing between the outer peripheral surfaces of film capacitors
f: Carrier frequency of inverter
n: Integer greater than or equal to zero The four space x1a, x2a, x1b, and x2b are indicated as the spaces between the film capacitors 31 to 34 in the example illustrated in FIG. 6. All of the four space x1a, x2a, x1b, and x2b may meet Expression (1) or Expression (2). Alternatively, one or more of the four space x1a, x2a, x1b, and x2b may meet Expression (1) or Expression (2).

For example, when the space x1a meets Expression (1) or Expression (2), the film capacitor 31 corresponds to a first film capacitor and the film capacitor 32 corresponds to a second film capacitor. At this time, the outer peripheral surface 31c is a first outer peripheral surface, the cross section 31b is a first cross section, the narrow surface 31e is a first narrow surface, and the wide surface 31g is a first wide surface. The outer peripheral surface 32c is a second outer peripheral surface, the cross section 32b is a second cross section, the narrow surface 32e is a second narrow surface, and the wide surface 32g is a second wide surface.

For example, when the space x1b meets Expression (1) or Expression (2), the film capacitor 31 corresponds to the first film capacitor and the film capacitor 33 corresponds to the second film capacitor. At this time, the outer peripheral surface 31c is the first outer peripheral surface, the cross section 31b is the first cross section, the narrow surface 31e is the first narrow surface, and the wide surface 31g is the first wide surface. The outer peripheral surface 33c is the second outer peripheral surface, the cross section 33b is the second cross section, the narrow surface 33e is the second narrow surface, and the wide surface 33g is the second wide surface.

The rigidity of the wide surfaces 31g to 34g of the film capacitors 31 to 34 is lower than the rigidity of the narrow surfaces 31e to 34e thereof. Accordingly, during the charge and discharge with the film capacitors 31 to 34, the vibration level of the wide surfaces 31g to 34g tends to be greater than that of the narrow surfaces 31e to 34e. Consequently, in the example illustrated in FIG. 6, the space x1a between the wide surface 31g and the wide surface 32g is desirably set to a value meeting Expression (1) or Expression (2). Similarly, the space x2a between the wide surface 33g and the wide surface 34g is desirably set to a value meeting Expression (1) or Expression (2).

An example of the distance when the space x between the film capacitors C1 and C2 is A will now be described. The air of 15° C. exists between the film capacitors C1 and C2 and the acoustic velocity in the air (medium) is 340.65 [m/s]. A carrier frequency f of the inverter 30 is 10 [kHz]. Since the wavelength λ is 34 [mm] at this time, the space x between the film capacitors C1 and C2 is 34 [mm].

Although the housing 50 of the capacitor module 10 is filled with the air 56 in the example illustrated in FIG. 6, the acoustic velocity in a potting material (in the medium) is used as an acoustic velocity v defining the space x when the potting material made of urethane resin or the like is injected into the housing 50. The temperature defining the acoustic velocity v is not limited to 15° C. described above and is appropriately determined depending the operating environment of the capacitor module 10.

As indicated in a range β1 in FIG. 7, when the space x between the film capacitors C1 and C2 is greater than or equal to zero and is smaller than (1/6)λ, the peak value of the combined wave w3 is capable of being lower than the peak value of the radiated sounds w1 and w2. In other words, it is possible to suppress the radiated sound from the capacitor module 10 including the film capacitors C1 and C2.

As indicated in a range B2, when the space x between the film capacitors C1 and C2 is greater than (5/6)λ and is smaller than (7/6)λ, the peak value of the combined wave w3 is capable of being lower than the peak value of the radiated sounds w1 and w2. In other words, it is possible to suppress the radiated sound from the capacitor module 10 including the film capacitors C1 and C2.

As indicated in a range B3, even when the space x between the film capacitors C1 and C2 is greater than $(11/6)\lambda$ and is smaller than $(13/6)\lambda$, the peak value of the combined wave w3 is capable of being lower than the peak value of the radiated sounds w1 and w2, as in the range B2 described above. In other words, it is possible to suppress the radiated sound from the capacitor module 10 including the film capacitors C1 and C2.

In one example, when the space x between the film capacitors C1 and C2 meets Expression (3) or Expression (4) indicated below, the peak value of the combined wave w3 is capable of being lower than the peak value of the radiated sounds w1 and w2. Accordingly, the degradation due to the overlapping of the radiated sounds w1 and w2 is capable of being suppressed to suppress the radiated sound from the capacitor module 10. Although the example is indicated in FIG. 7 in which n=0 or n=1, the value of n is not limited to this. Even if n is higher than or equal to two, the radiated sound is suppressed in the same manner.

$$0 \le x < \frac{1}{6}\lambda \qquad (3)$$

$$\left(\frac{5}{6}+n\right)\lambda < x < \left(\frac{7}{6}+n\right)\lambda \qquad (4)$$

In Expressions (3) and (4), $$\lambda = v/f$$

v: Acoustic velocity in medium existing between the outer peripheral surfaces of film capacitors
f: Carrier frequency of inverter
n: Integer greater than or equal to zero The four space x1a, x2a, x1b, and x2b are indicated as the spaces between the film capacitors 31 to 34 in the example illustrated in FIG. 6. All of the four space x1a, x2a, x1b, and x2b may meet Expression (3) or Expression (4). Alternatively, one or more of the four space x1a, x2a, x1b, and x2b may meet Expression (3) or Expression (4).

For example, when the space x1a meets Expression (3) or Expression (4), the film capacitor 31 corresponds to the first film capacitor and the film capacitor 32 corresponds to the second film capacitor. At this time, the outer peripheral surface 31c is the first outer peripheral surface, the cross section 31b is the first cross section, the narrow surface 31e is the first narrow surface, and the wide surface 31g is the first wide surface. The outer peripheral surface 32c is the second outer peripheral surface, the cross section 32b is the second cross section, the narrow surface 32e is the second narrow surface, and the wide surface 32g is the second wide surface.

For example, when the space x1b meets Expression (3) or Expression (4), the film capacitor 31 corresponds to the first film capacitor and the film capacitor 33 corresponds to the second film capacitor. At this time, the outer peripheral surface 31c is the first outer peripheral surface, the cross section 31b is the first cross section, the narrow surface 31e is the first narrow surface, and the wide surface 31g is the first wide surface. The outer peripheral surface 33c is the second outer peripheral surface, the cross section 33b is the second cross section, the narrow surface 33e is the second narrow surface, and the wide surface 33g is the second wide surface.

The rigidity of the wide surfaces 31g to 34g of the film capacitors 31 to 34 is lower than the rigidity of the narrow surfaces 31e to 34e thereof. Accordingly, during the charge and discharge with the film capacitors 31 to 34, the vibration level of the wide surfaces 31g to 34g tends to be greater than that of the narrow surfaces 31e to 34e. Consequently, in the example illustrated in FIG. 6, the space x1a between the wide surface 31g and the wide surface 32g is desirably set to a value meeting Expression (3) or Expression (4). Similarly, the space x2a between the wide surface 33g and the wide surface 34g is desirably set to a value meeting Expression (3) or Expression (4).

Although the space x between the film capacitors C1 and C2 is set to a value meeting Expression (1) or Expression (2) in the above description, the space x between the film capacitors C1 and C2 is not limited to this. Although the space x between the film capacitors C1 and C2 is set to a value meeting Expression (3) or Expression (4) in the above description, the space x between the film capacitors C1 and C2 is not limited to this.

As indicated in FIG. 7, the space x is desirably close to "0" in order to decrease the peak value of the combined wave w3. Accordingly, the space x between the film capacitors C1 and C2 more desirably meets Expression (5) described below, rather than Expression (1). In addition, the space x between the film capacitors C1 and C2 more desirably meets Expression (6) described below, rather than Expression (5). Furthermore, the space x between the film capacitors C1 and C2 more desirably meets Expression (7) described below, rather than Expression (6).

$$0 \le x \le \frac{1}{8}\lambda \qquad (5)$$

$$0 \le x \le \frac{1}{9}\lambda \qquad (6)$$

$$0 \le x \le \frac{1}{10}\lambda \qquad (7)$$

In Expressions (5) to (7), $$\lambda = v/f$$

v: Acoustic velocity in medium existing between the outer peripheral surfaces of film capacitors
f: Carrier frequency of inverter Although "0" is included as the space x between the film capacitors C1 and C2 in the above description, the space x between the film capacitors C1 and C2 is not limited to this. Expression (8) described below may be used, instead of Expression (1) described above, and Expression (9) described below may be used, instead of Expression (3) described above. In terms of decreasing the peak value of the combined wave w3, the space x between the film capacitors C1 and C2 more desirably meets Expression (10) described below, rather than Expression (8) and Expression (9). In addition, the space x between the film capacitors C1 and C2 more desirably meets Expression (11) described below, rather than Expression (10). Furthermore, the space x between the film capacitors C1 and C2 more desirably meets Expression (12) described below, rather than Expression (11).

$$0 < x \le \frac{1}{6}\lambda \quad (8)$$

$$0 < x < \frac{1}{6}\lambda \quad (9)$$

$$0 < x \le \frac{1}{8}\lambda \quad (10)$$

$$0 < x \le \frac{1}{9}\lambda \quad (11)$$

$$0 < x \le \frac{1}{10}\lambda \quad (12)$$

In Expressions (8) to (12), $$\lambda = v/f$$

v: Acoustic velocity in medium existing between the outer peripheral surfaces of film capacitors
f: Carrier frequency of inverter As indicated in FIG. 7, the space x is desirably close to "λ" or "2λ" in order to decrease the peak value of the combined wave w3. Accordingly, the space x between the film capacitors C1 and C2 more desirably meets Expression (13) described below, rather than Expression (2). In addition, the space x between the film capacitors C1 and C2 more desirably meets Expression (14) described below, rather than Expression (13). Furthermore, the space x between the film capacitors C1 and C2 more desirably meets Expression (15) described below, rather than Expression (14).

$$\left(\frac{7}{8}+n\right)\lambda \le x \le \left(\frac{9}{8}+n\right)\lambda \quad (13)$$

$$\left(\frac{8}{9}+n\right)\lambda \le x \le \left(\frac{10}{9}+n\right)\lambda \quad (14)$$

$$\left(\frac{9}{10}+n\right)\lambda \le x \le \left(\frac{11}{10}+n\right)\lambda \quad (15)$$

In Expressions (13) to (15), $$\lambda = v/f$$

v: Acoustic velocity in medium existing between the outer peripheral surfaces of film capacitors
f: Carrier frequency of inverter
n: Integer greater than or equal to zero The carrier frequency of the inverter 30 may be a fixed carrier frequency, or multiple carrier frequencies $f_1$ that are switched through control may be set as the carrier frequency of the inverter 30. When the multiple carrier frequencies $f_1$ are switched for use, the carrier frequencies $f_1$ are desirably set based on Expression (16) described below. This enables the radiated sound from the capacitor module 10 to be suppressed even when the carrier frequencies $f_1$ are switched. In this case, Expression (1) and Expression (2) described above may be replaced with Expression (17) and Expression (18) described below. Similarly, Expression (3) and Expression (4) described above may be replaced with Expression (19) and Expression (20) described below.

$$f_1 = f_0 \times m \quad (16)$$

In Equation (16),
$f_0$=Reference carrier frequency
m: Natural number greater than or equal to one $$0 \le x \le \frac{1}{6}\frac{v}{f_0 m} \quad (17)$$

$$\left(\frac{5}{6}+n\right)\frac{v}{f_0 m} \le x \le \left(\frac{7}{6}+n\right)\frac{v}{f_0 m} \quad (18)$$

In Expressions (17) and (18),
v: Acoustic velocity in medium existing between the outer peripheral surfaces of film capacitors
$f_0$: Reference carrier frequency
m: Natural number greater than or equal to one
n: Integer greater than or equal to zero $$0 \le x < \frac{1}{6}\frac{v}{f_0 m} \quad (19)$$

$$\left(\frac{5}{6}+n\right)\frac{v}{f_0 m} < x < \left(\frac{7}{6}+n\right)\frac{v}{f_0 m} \quad (20)$$

Figure 16:
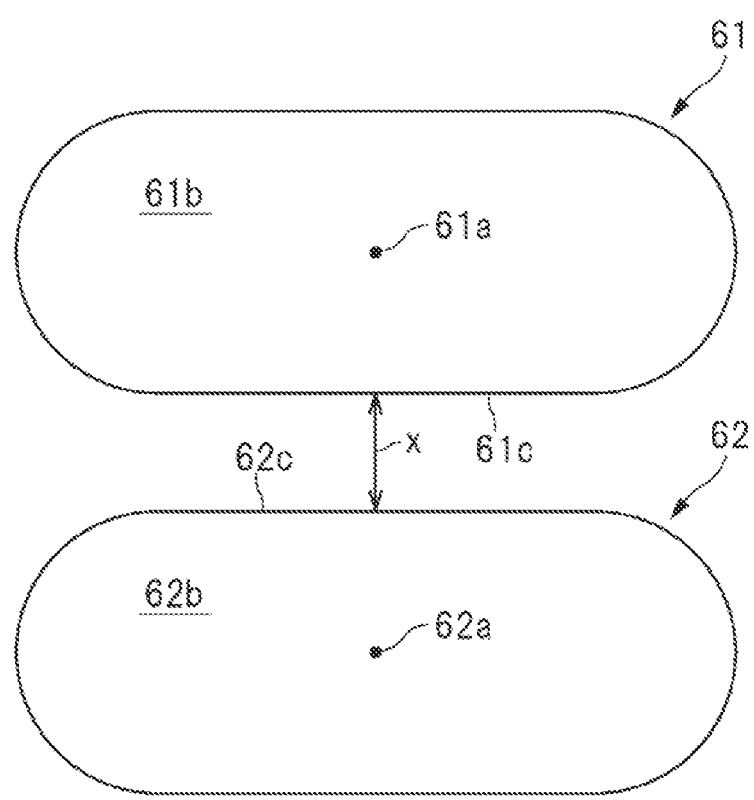
FIG. 16 is a diagram illustrating film capacitors of another shape.

In Expressions (19) and (20),
v: Acoustic velocity in medium existing between the outer peripheral surfaces of film capacitors
$f_0$: Reference carrier frequency
m: Natural number greater than or equal to one
n: Integer greater than or equal to zero Although the cross sections 31b to 34b of the film capacitors 31 to 34 have oval shapes in the example illustrated in FIG. 5, the shapes of the cross sections 31b to 34b of the film capacitors 31 to 34 are not limited to this. FIG. 16 is a diagram illustrating film capacitors 61 and 62 of another shape. As illustrated in FIG. 16, a first cross section 61b orthogonal to a center line 61a of the film capacitor 61 may have an elliptical shape, that is, a flattened shape. A second cross section 62b orthogonal to a center line 62a of the film capacitor 62 may have an elliptical shape, that is, a flattened shape. Even in this case, setting the space x between a first outer peripheral surface 61c and a second outer peripheral surface 62c, which are opposed to each other, so as to meet Expression (1) or Expression (2), or Expression (3) or Expression (4) enables the radiated sound from the capacitor module to be suppressed.

Figure 17:
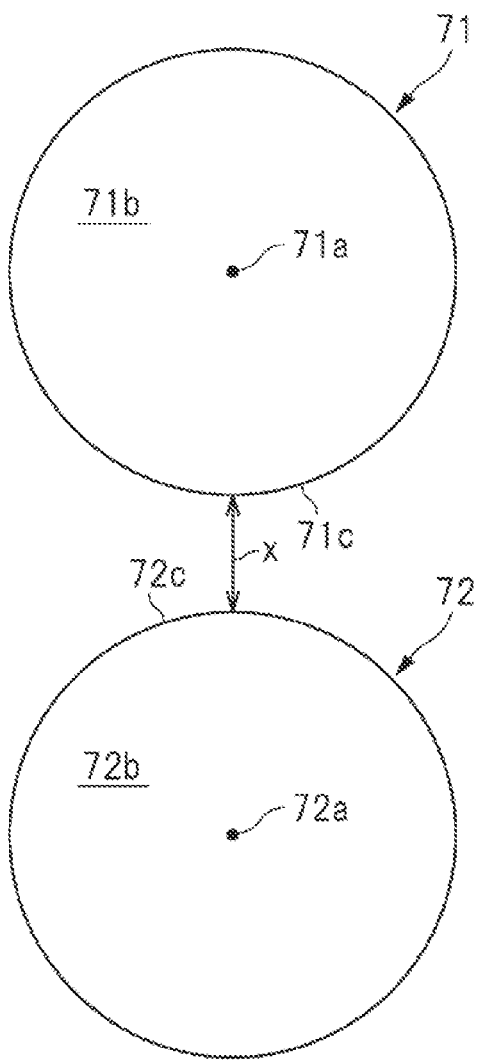
FIG. 17 is a diagram illustrating film capacitors of another shape.

FIG. 17 is a diagram illustrating film capacitors 71 and 72 of another shape. As illustrated in FIG. 17, a first cross section 71b orthogonal to a center line 71a of the film capacitor 71 may have a circular shape. A second cross section 72b orthogonal a center line 72a of the film capacitor 72 may have a circular shape. Even in this case, setting the space x between a first outer peripheral surface 71c and a second outer peripheral surface 72c, which are opposed to each other, so as to meet Expression (1) or Expression (2), or Expression (3) or Expression (4) enables the radiated sound from the capacitor module to be suppressed.

The disclosure is not limited the above embodiments and various modifications are available without departing from the scope of the disclosure. For example, although the four film capacitors 31 to 34 are included in the capacitor module 10 in the above description, the capacitor module 10 is not limited to this configuration. For example, two film capacitors may constitute one capacitor module or three or more film capacitors may constitute one capacitor module. Although the film capacitors having substantially the same shape are opposed to each other in the illustrated examples, the configuration is not limited to this. The film capacitors having different shapes may be opposed to each other.

Although the capacitor module 10 is included in the power conversion unit 17 in the electric vehicle 11 in the above description, the disclosure is not limited to this. The disclosure may be applied to a capacitor module provided in an apparatus other than the vehicle. Although the example is described above in which the multiple carrier frequencies are switched for use, the space x may be set so as to meet Expression (1) or Expression (2), Expression (3) or Expression (4), or the like when one or more of the multiple carrier frequencies is used.

According to an aspect of the disclosure, it is possible to suppress the radiated sound from the capacitor module.

The capacitor module 10 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the capacitor module 10 including the film capacitors 31 to 34. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A capacitor module provided between a power storage body and an inverter, the capacitor module comprising:
    a first film capacitor that is wound and includes a first outer peripheral surface; and
    a second film capacitor that is wound and connected in parallel to the first film capacitor, the second film capacitor including a second outer peripheral surface opposed to the first outer peripheral surface, wherein
    a space x between the first outer peripheral surface and the second outer peripheral surface meets Expression (1) or Expression (2) indicated below:

$$0 \le x \le \frac{1}{6}\lambda \quad (1)$$

$$\left(\frac{5}{6}+n\right)\lambda \le x \le \left(\frac{7}{6}+n\right)\lambda \quad (2)$$

wherein $$\lambda = v/f$$

v: Acoustic velocity in medium existing between the first outer peripheral surface and the second outer peripheral surface
f: Carrier frequency of the inverter
n: Integer greater than or equal to zero.

2. The capacitor module according to claim 1,
    wherein a first cross section orthogonal to a center line of the first film capacitor has a flattened shape,
    wherein the first outer peripheral surface includes a first narrow surface orthogonal to a long axis of the first cross section and a first wide surface orthogonal to a short axis of the first cross section,
    wherein a second cross section orthogonal to a center line of the second film capacitor has a flattened shape,
    wherein the second outer peripheral surface includes a second narrow surface orthogonal to a long axis of the second cross section and a second wide surface orthogonal to a short axis of the second cross section, and
    wherein the first wide surface constituting the first outer peripheral surface is opposed to the second wide surface constituting the second outer peripheral surface.

3. The capacitor module according to claim 1,
    wherein a first cross section orthogonal to a center line of the first film capacitor has a flattened shape,
    wherein the first outer peripheral surface includes a first narrow surface orthogonal to a long axis of the first cross section and a first wide surface orthogonal to a short axis of the first cross section,
    wherein a second cross section orthogonal to a center line of the second film capacitor has a flattened shape,
    wherein the second outer peripheral surface includes a second narrow surface orthogonal to a long axis of the second cross section and a second wide surface orthogonal to a short axis of the second cross section, and
    wherein the first narrow surface constituting the first outer peripheral surface is opposed to the second narrow surface constituting the second outer peripheral surface.

4. The capacitor module according to claim 1, wherein the space x between the first outer peripheral surface and the second outer peripheral surface meets Expression (3) or Expression (4) indicated below:

$$0 \le x < \frac{1}{6}\lambda \quad (3)$$

$$\left(\frac{5}{6}+n\right)\lambda < x < \left(\frac{7}{6}+n\right)\lambda \quad (4)$$

wherein $$\lambda = v/f$$

v: Acoustic velocity in medium existing between the first outer peripheral surface and the second outer peripheral surface
f: Carrier frequency of the inverter
n: Integer greater than or equal to zero.

* * * * *